(12) United States Patent
Iizuka et al.

(10) Patent No.: US 12,146,078 B2
(45) Date of Patent: Nov. 19, 2024

(54) ADHESIVE RESIN COMPOSITION AND LAMINATE

(71) Applicant: FUJIMORI KOGYO CO., LTD., Tokyo (JP)

(72) Inventors: Hirokazu Iizuka, Tokyo (JP); Kunihiro Takei, Tokyo (JP); Jun Suzuki, Tokyo (JP)

(73) Assignee: FUJIMORI KOGYO CO., LTD., Tokyo (JP)

( * ) Notice: Subject to any disclaimer, the term of this patent is extended or adjusted under 35 U.S.C. 154(b) by 0 days.

(21) Appl. No.: 17/561,354

(22) Filed: Dec. 23, 2021

(65) Prior Publication Data

US 2022/0112412 A1    Apr. 14, 2022

Related U.S. Application Data

(63) Continuation of application No. 16/052,615, filed on Aug. 2, 2018, now Pat. No. 11,242,475.

(30) Foreign Application Priority Data

Aug. 23, 2017  (JP) ................................. 2017-160386

(51) Int. Cl.
*C09J 151/06* (2006.01)
*C09J 123/26* (2006.01)

(52) U.S. Cl.
CPC ........... *C09J 123/26* (2013.01); *C09J 151/06* (2013.01); *C08L 2205/03* (2013.01); *Y10T 428/28* (2015.01); *Y10T 428/287* (2015.01)

(58) Field of Classification Search
None
See application file for complete search history.

(56) References Cited

U.S. PATENT DOCUMENTS

| | | | |
|---|---|---|---|
| 9,825,264 B2 | 11/2017 | Nakazato et al. | |
| 10,669,456 B2 * | 6/2020 | Iizuka | C09J 123/26 |
| 11,242,475 B2 * | 2/2022 | Iizuka | C09J 123/26 |
| 2004/0220336 A1 * | 11/2004 | Abhari | C08F 8/00 525/70 |
| 2006/0293424 A1 | 12/2006 | Tse et al. | |
| 2012/0046418 A1 | 2/2012 | Seo et al. | |
| 2012/0279654 A1 | 11/2012 | Jialanella et al. | |
| 2015/0315400 A1 | 11/2015 | Yano et al. | |
| 2016/0280901 A1 | 9/2016 | Ohfuji et al. | |
| 2017/0088753 A1 | 3/2017 | Nakamura et al. | |
| 2017/0096586 A1 | 4/2017 | Sakata et al. | |
| 2017/0297302 A1 | 10/2017 | Okimura et al. | |
| 2018/0090724 A1 | 3/2018 | Miyazaki et al. | |
| 2019/0031928 A1 | 1/2019 | Iizuka et al. | |
| 2019/0062605 A1 | 2/2019 | Iizuka et al. | |

FOREIGN PATENT DOCUMENTS

| | | |
|---|---|---|
| JP | H1046122 A | 2/1998 |
| JP | 2002053730 A | 2/2002 |
| JP | 2013071972 A | 4/2013 |
| JP | 2015059198 A | 3/2015 |
| JP | 5771493 B2 | 9/2015 |
| JP | 2016035035 A | 3/2016 |
| JP | 2016124876 A | 7/2016 |
| JP | 2016125042 A | 7/2016 |
| JP | 2017141324 A | 8/2017 |
| WO | 2014088015 A1 | 6/2014 |
| WO | 2015083721 A1 | 6/2015 |
| WO | 2015190411 A1 | 12/2015 |
| WO | 2016042837 A1 | 3/2016 |
| WO | 2016047289 A1 | 3/2016 |
| WO | 2017006681 A1 | 1/2017 |
| WO | 2018030050 A1 | 2/2018 |

OTHER PUBLICATIONS

Machine transatlion of JP2016125042 A (Year: 2016).*
Notice of Allowance in Corresponding Japanese Patent Application No. 2017-160386, dated May 24, 2022; 5 pgs.
Office Action for Korean Patent Application No. 10-2018-0090292 dated Dec. 16, 2019; 10 pgs.
Office Action for Chinese Patent Application No. 201810871728.X dated Apr. 16, 2020; 11 pgs. Apr. 16, 2020.
Notice of Allowance for Korean Patent Application No. 10-2018-0090292 dated Jun. 25, 2020; 3 pgs.

(Continued)

*Primary Examiner* — Anish P Desai
(74) *Attorney, Agent, or Firm* — HAUPTMAN HAM, LLP

(57) ABSTRACT

Provided are an adhesive resin composition having high adhesiveness and high strength in acid resistance, and a laminate including the same. Provided is an adhesive resin composition including an acid-modified polyolefin resin component (A) having a weight average molecular weight of 30,000 or more and 150,000 or less, a resin component (B) having an epoxy group in a molecule, a resin component (C) having an amino group at a molecular end, and a solvent (S), in which a content of the resin component (B) is 1 part by mass or more and 30 parts by mass or less based on 100 parts by mass of the acid-modified polyolefin resin component (A), and a content of the resin component (C) is 0.5 parts by mass or more and 15 parts by mass or less based on 100 parts by mass of the acid-modified polyolefin resin component (A).

4 Claims, 2 Drawing Sheets

(56) References Cited

OTHER PUBLICATIONS

Notice of Allowance for Chinese Patent Application No. 201810871728.X dated Nov. 12, 2020; 4 pgs.
Office Action for Korean Patent Application No. 10-2020-0121897 dated Nov. 17, 2020; 7 pgs.
Notice of Allowance in Korean Patent Application No. 10-2020-0121897 dated Mar. 26, 2021; 4 pgs.
Office Action in Japanese Patent Application No. 2017-160386 dated Jun. 15, 2021; 6 pgs.
Pham, H. Q and Marks, M. J., "Epoxy Resins", Encyclopedia of Polymer Science and Technology, vol. 9, pp. 678-804, published on line Jul. 15, 2004.
Office Action in Corresponding Japanese Patent Application No. 2022-099825, dated Aug. 8, 2023; 6 pgs.

* cited by examiner

ADHESIVE RESIN COMPOSITION AND LAMINATE

CROSS REFERENCE TO RELATED APPLICATIONS

This application is a continuation of U.S. Application Ser. No. 16/052,615 filed Aug. 2, 2018, which claims priority from Japanese Patent Application No. 2017-160386, filed Aug. 23, 2017. The entire teachings of the above application are incorporated herein by reference.

BACKGROUND OF THE INVENTION

(1) Field of the Invention

The present invention relates to an adhesive resin composition and a laminate.

(2) Description of Related Art

In the fields of outer packages and packages used in outer packaging, packaging or the like of industrial products such as electronic devices and batteries, and daily necessaries such as foods, beverages, cosmetics, and medicaments, a laminate obtained by combining and laminating a resin material such as polyethylene and polypropylene, and a metal material such as an aluminum foil is used.

In order to improve the adhesiveness between the resin material and the metal material, various studies regarding an adhesive composition for adhering these have been made.

For example, Japanese Patent No. 5771493 describes a melting and kneading-type adhesive resin composition containing a graft copolymer (G) obtained by, first, graft-polymerizing an acid-modified polyolefin resin (A) with a polyamide resin (B) to obtain a resin (C), and further graft-polymerizing the resin (C) with an epoxy group-containing resin (D) having two or more epoxy groups in one molecule, in which, based on 100% by mass of a total of the above-mentioned acid-modified polyolefin resin (A), the above-mentioned polyamide resin (B), and the above-mentioned epoxy group-containing resin (D), the above-mentioned acid-modified polyolefin resin (A) is contained in a range of 85 to 98% by mass, the above-mentioned polyamide resin (B) is contained in a range of 1 to 9% by mass, and the above-mentioned epoxy group-containing resin (D) is contained in a range of 1 to 14% by mass.

SUMMARY OF THE INVENTION

Meanwhile, for example, in an adhesive resin composition used in the interior of outer packages of batteries such as a lithium secondary battery, a hydrogen fuel battery, and a solar battery, the situation where the composition is brought into contact with an acidic electrolytic solution is assumed. For that reason, the adhesive resin composition is required to have high strength in acid resistance, in addition to high adhesiveness. In the present specification, "high strength in acid resistance" means that the adhesion strength is not reduced even when the adhesive resin composition is brought into contact with an acid.

The present invention has been made in view of the above-mentioned circumstances, and an object thereof is to provide an adhesive resin composition having high adhesiveness and high strength in acid resistance, and a laminate including the same.

That is, the present invention has adopted the following constituent features.

[1] An adhesive resin composition comprising an acid-modified polyolefin resin component (A) having a weight average molecular weight of 30,000 or more and 150,000 or less, a resin component (B) having an epoxy group in a molecule, a resin component (C) having an amino group at a molecular end, and a solvent (S), wherein a content of the resin component (B) is 1 part by mass or more and 30 parts by mass or less based on 100 parts by mass of the acid-modified polyolefin resin component (A), and a content of the resin component (C) is 0.5 parts by mass or more and 15 parts by mass or less based on 100 parts by mass of the acid-modified polyolefin resin component (A).

[2] The adhesive resin composition according to [1], wherein the acid-modified polyolefin resin component (A) has an acid addition amount of 0.5% by mass or more and 3.0% by mass or less.

[3] The adhesive resin composition according to [1] or [2], wherein the acid-modified polyolefin resin component (A) has a melting point of 50° C. or higher and 85° C. or lower.

[4] The adhesive resin composition according to any one of [1] to [3], wherein the resin component (C) is at least one resin selected from the group consisting of an olefin resin in which a molecular end is modified with an amino group, a polyamine resin, a polyamide resin in which a molecular end is modified with an amino group, a melamine resin, and a urea resin.

[5] The adhesive resin composition according to any one of [1] to [4], wherein the resin component (C) has a weight average molecular weight of 2,000 or more.

[6] The adhesive resin composition according to any one of [1] to [5], further comprising an isocyanate compound (D).

[7] The adhesive resin composition according to any one of [1] to [6], wherein the resin component (B) is a novolac-modified epoxy resin.

[8] The adhesive resin composition according to any one of [1] to [7], wherein the resin component (B) contains a compound having a bisphenol A structure in the molecule.

[9] A laminate comprising an adherend and an adhesive resin layer laminated on one side of the adherend, wherein the adhesive resin layer is formed of the adhesive resin composition according to any one of [1] to [8].

The present invention can provide an adhesive resin composition having high adhesiveness and high strength in acid resistance, and a laminate including the same.

DETAILED DESCRIPTION OF THE INVENTION

Figure 1:
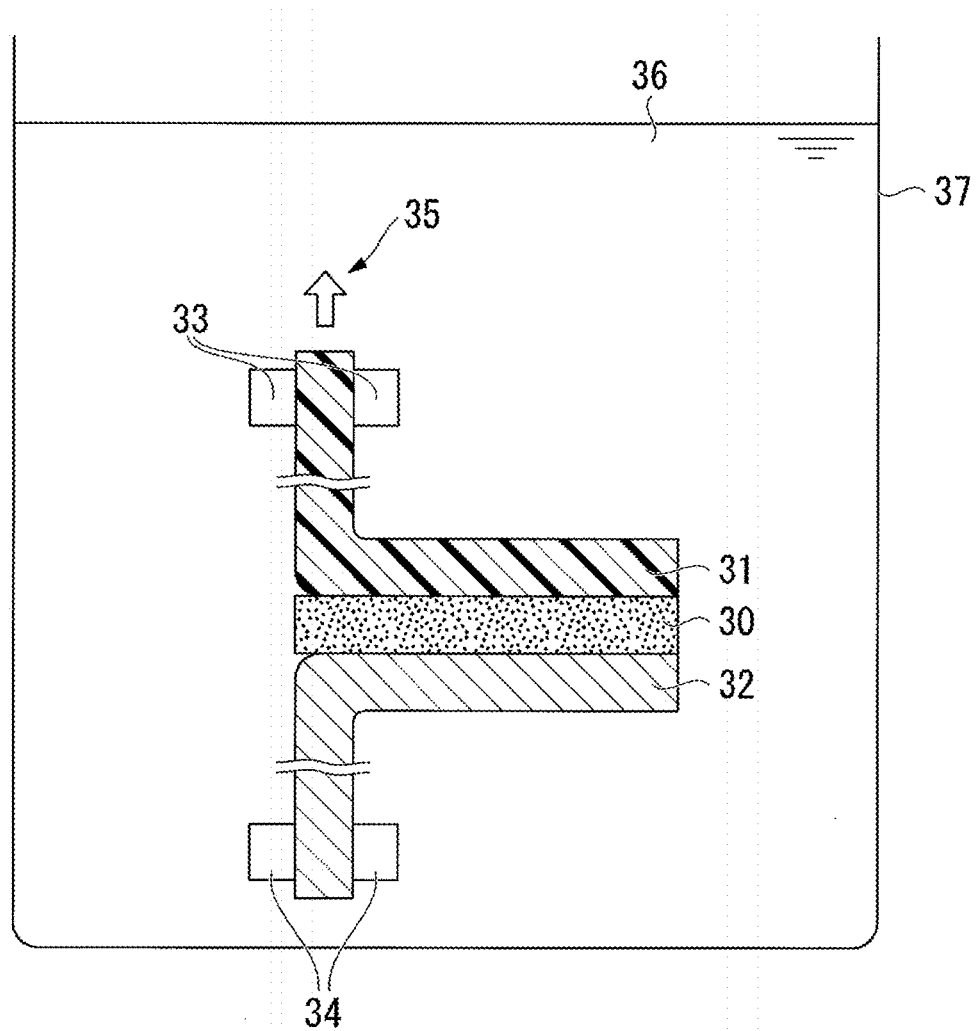
FIG. 1 is a schematic view of a device used in a peeling test.

In the present specification, as a molecular weight of a polymer, a weight average molecular weight in terms of polystyrene by gel permeation chromatography (GPC) is used.

Hereinafter, the present invention will be described based on preferred embodiments.

Adhesive Resin Composition

The present invention relates to an adhesive resin composition containing an acid-modified polyolefin resin component (A) having a weight average molecular weight of 30,000 or more and 150,000 or less, a resin component (B) having an epoxy group in a molecule, a resin component (C) having an amino group at a molecular end, and a solvent (S). The adhesive resin composition of the present invention is in a liquid state. For that reason, by applying the composition to an adherend and drying the resulting product, an adhesive film can be formed.

The adhesive resin composition of the present invention exerts the effect that the acid resistance is high, in addition to high adhesiveness. For that reason, the adhesive resin composition can be suitably used in the interior of outer packages of batteries such as a lithium secondary battery, a hydrogen fuel battery, and a solar battery, where the adhesive resin composition is assumed to be brought into contact with an acidic electrolytic solution.

Hereinafter, each component constituting the adhesive resin composition of the present invention will be described.

<<(A) Component>>

The adhesive resin composition of the present embodiment contains an acid-modified polyolefin resin component having a weight average molecular weight of 30,000 or more and 150,000 or less (hereinafter, described as "(A) component").

In the present embodiment, the (A) component is a polyolefin-based resin modified with an unsaturated carboxylic acid or a derivative thereof, and has an acid functional group such as a carboxy group or a carboxylic anhydride group in the polyolefin-based resin. Since the acid functional group such as a carboxy group or a carboxylic anhydride group interacts with the surface of an adherend, the (A) component is a component contributing to the adhesiveness.

The (A) component is obtained by modification of a polyolefin-based resin with an unsaturated carboxylic acid or a derivative thereof, copolymerization of an acid functional group-containing monomer with olefins, or the like. Inter alia, as the (A) component, a material obtained by acid-modifying a polyolefin-based resin is preferable. An example of the acid-modifying method includes graft modification of melting and kneading a polyolefin resin and an acid functional group-containing monomer, in the presence of a radical polymerization initiator such as an organic peroxide or an aliphatic azo compound.

Examples of the above-mentioned polyolefin-based resin include polyethylene, polypropylene, poly-1-butene, polyisobutylene, a copolymer of propylene and ethylene, a copolymer of propylene and an olefin-based monomer, and the like.

Examples of the above-mentioned olefin-based monomer subjected to copolymerization include 1-butene, isobutylene, 1-hexene, and the like.

Inter alia, as the (A) component, maleic anhydride-modified polypropylene is preferable from the viewpoint of the adhesiveness, durability, and the like.

Weight Average Molecular Weight

In the present embodiment, the (A) component has a weight average molecular weight of 30,000 or more and 150,000 or less. The (A) component has a weight average molecular weight of preferably 40,000 or more, more preferably 50,000 or more, and particularly preferably 60,000 or more. Additionally, the weight average molecular weight is preferably 140,000 or less, more preferably 130,000 or less, and particularly preferably 120,000 or less. The above-mentioned upper limit values and lower limit values can be arbitrarily combined.

Acid Addition Amount

Examples of the unsaturated carboxylic acid to be used in modification include acrylic acid, methacrylic acid, maleic acid, nadic acid, fumaric acid, itaconic acid, crotonic acid, citraconic acid, sorbic acid, mesaconic acid, angelic acid, and the like. Additionally, examples of the derivative of the unsaturated carboxylic acid include acid anhydrides, esters, amides, imides, metal salts, and the like, and specific examples thereof include maleic anhydride, itaconic anhydride, citraconic anhydride, nadic anhydride, methyl acrylate, methyl methacrylate, ethyl acrylate, butyl acrylate, maleic acid monoethyl ester, acrylamide, maleic acid monoamide, maleimide, N-butylmaleimide, sodium acrylate, sodium methacrylate, and the like. Among these, an unsaturated dicarboxylic acid and a derivative thereof are preferable, and particularly, maleic anhydride or phthalic anhydride is suitable.

In the present embodiment, it is preferable that a carboxylic acid addition amount of the (A) component is 0.5% by mass or more and 3.0% by mass or less.

Melting Point

In the present embodiment, the (A) component has a melting point of preferably 50° C. or higher, more preferably 55° C. or higher, and particularly preferably 60° C. or higher. Additionally, an upper limit value of the melting point is preferably 90° C. or lower, more preferably 85° C. or lower, and particularly preferably 83° C. or lower. The above-mentioned upper limit values and lower limit values can be arbitrarily combined. In the present embodiment, the melting point is more preferably 50° C. or higher and 85° C. or lower.

<<(B) Component>>

The adhesive resin composition of the present embodiment contains a resin component having an epoxy group in the molecule (hereinafter, described as "(B) component"). Since the epoxy group interacts with the surface of an adherend, the (B) component is a component contributing to the adhesiveness.

Examples of the (B) component include a copolymer of an epoxy group-containing vinyl monomer, a phenoxy resin synthesized from bisphenols and epichlorohydrin, various epoxy resins, and the like.

Additionally, as the (B) component, glycidyl esters such as glycidyl methacrylate (GMA) and glycidyl acrylate, glycidyl ethers such as allyl glycidyl ether, epoxyalkenes such as epoxybutene, and the like may be used.

Additionally, in the copolymer of an epoxy group-containing vinyl monomer, examples of other monomers that are copolymerized with the epoxy group-containing vinyl monomer include olefins such as ethylene and propylene, acrylic-based monomers such as (meth)acrylic acid ester, vinyl acetate, and the like.

Examples of the copolymer of an epoxy group-containing vinyl monomer include an ethylene-glycidyl methacrylate (E-GMA) copolymer and the like.

As the phenoxy resin, a phenoxy resin having epoxy groups at both ends is used, and examples of bisphenols thereof include bisphenol A, bisphenol F, a copolymerization type thereof, and the like.

Examples of the (B) component include a bisphenol-type epoxy resin, a novolac-type epoxy resin, a glycidyl amine-type epoxy resin, a glycidyl ester-type epoxy resin, and the like. In the present embodiment, it is preferable that the (B) component is a novolac-modified epoxy resin. Additionally, in the present embodiment, it is preferable that the (B) component contains a compound having a bisphenol A structure in the molecule.

From the viewpoint of improving crosslinking strength at the time of adhesion, it is preferable that the (B) component has a weight average molecular weight (Mw) in a range of 5,000 or more and 100,000 or less.

Content

In the present embodiment, the content of the above-mentioned resin component (B) is 1 part by mass or more, preferably 5 parts by mass or more, and more preferably 10 parts by mass or more, based on 100 parts by mass of the above-mentioned acid-modified polyolefin resin component (A). Additionally, the content is 30 parts by mass or less, preferably 25 parts by mass or less, and more preferably 22 parts by mass or less.

The above-mentioned upper limit values and lower limit values can be arbitrarily combined. By adjusting the content in the above-mentioned range, an adhesive resin composition having high adhesiveness and high durability can be obtained.

<<(C) Component>>

The adhesive resin composition of the present embodiment contains a resin component having an amino group at a molecular end (hereinafter, described as "(C) component"). The amino group included in the (C) component neutralizes, for example, hydrofluoric acid generated from an electrolytic solution. For that reason, the adhesive resin composition of the present embodiment can exert high acid resistance. That is, the (C) component is a component contributing to the acid resistance.

It is preferable that the (C) component is at least one selected from the group consisting of an olefin resin in which a molecular end is modified with an amino group, a polyamine resin, a polyamide resin in which a molecular end is modified with an amino group, a melamine resin, and a urea resin.

More specifically, examples of the (C) component include diethylenetriamine (DETA), triethylenetetramine (TETA), tetraethylenepentamine (TEPA), an amine-modified hydrogenated styrene-based thermoplastic elastomer in which a molecular end is modified with an amino group, polyethyleneimine, nylon 6, nylon 66, nylon 12, and the like.

In the present embodiment, from the viewpoint of improving crosslinking strength at the time of adhesion, the (C) component has a weight average molecular weight of preferably 2,000 or more, and further preferably 5,000 or more. The upper limit value of the weight average molecular weight is not particularly limited, but one example can be 1,000,000 or less, 500,000 or less, or 200,000 or less.

Content

The content of the above-mentioned resin component (C) based on 100 parts by mass of the above-mentioned acid-modified polyolefin resin component (A) is 0.5 parts by mass or more, preferably 1 part by mass or more, more preferably 5 parts by mass or more, and particularly preferably 6 parts by mass or more. Additionally, the content is 15 parts by mass or less, preferably 14 parts by mass or less, more preferably 13 parts by mass or less, and particularly preferably 12 parts by mass or less. By adjusting the addition amount in the above-mentioned range, the adhesion strength can be sufficiently retained while highly maintaining the effect of neutralizing hydrofluoric acid.

The above-mentioned upper limit values and lower limit values can be arbitrarily combined.

The acid functional group such as a carboxy group or a carboxylic anhydride group in the above-mentioned (A) component can interact with or bind to the terminal amino group of the above-mentioned (C) component. Additionally, the acid functional group such as a carboxy group and a carboxylic anhydride group in the above-mentioned (A) component can interact with or bind to the epoxy group of the above-mentioned (B) component. For that reason, the (A) component, the (B) component, and the (C) component that are essential components in the present embodiment are easily compatible with one another, and can make the coatability favorable when the adhesive resin composition is produced.

<<(S) Component>>

In order to bring the adhesive resin composition of the present embodiment into a liquid state, the composition contains a solvent component.

Specific examples of the solvent (hereinafter, described as "(S) component") include aromatic solvents such as toluene, xylene, anisole, ethyl benzyl ether, cresyl methyl ether, diphenyl ether, dibenzyl ether, phenetole, butyl phenyl ether, ethylbenzene, diethylbenzene, pentylbenzene, isopropylbenzene, cymene, and mesitylene; aliphatic solvents such as n-hexane; ketone-based solvents such as acetone, methyl ethyl ketone, cyclohexanone, methyl-n-pentyl ketone, methyl isopentyl ketone, and 2-heptanone; ester-based solvents such as methyl lactate, ethyl lactate, methyl acetate, ethyl acetate, butyl acetate, methyl pyruvate, ethyl pyruvate, methyl methoxypropionate, and ethyl ethoxypropionate; alcohol-based solvents such as methanol, ethanol, isopropyl alcohol, ethylene glycol, diethylene glycol, propylene glycol, and dipropylene glycol; and the like.

<<Optional Components>>

It is preferable that the adhesive resin composition of the present embodiment comprises an isocyanate compound (D) (hereinafter, described as "(D) component").

Examples of the (D) component include bifunctional or tri- or more-functional isocyanate compounds, bifunctional or tri- or more-functional epoxy compounds, bifunctional or tri- or more-functional acrylate compounds, metal chelate compounds, and the like. Inter alia, a polyisocyanate compound (bifunctional or tri- or more-functional isocyanate compound) is preferable, and a tri- or more-functional isocyanate compound is more preferable.

When the adhesive resin composition contains the (D) component, it is preferable that the composition contains the (D) component in an amount of 0.1 parts by mass or more and 10 parts by mass or less, based on 100 parts by mass of the above-mentioned (A) component.

The tri- or more-functional isocyanate compound may be a polyisocyanate compound having at least three isocyanate (NCO) groups in one molecule. The polyisocyanate compound is classified into aliphatic isocyanate, aromatic isocyanate, acyclic isocyanate, alicyclic isocyanate or the like, and any of them may be used. Specific examples of the polyisocyanate compound include aliphatic isocyanate compounds such as hexamethylene diisocyanate (HDI), isophorone diisocyanate (IPDI), and trimethyl hexamethylene diisocyanate (TMDI), and aromatic isocyanate compounds such as diphenylmethane diisocyanate (MDI), xylylene diisocyanate (XDI), hydrogenated xylylene diisocyanate (H6XDI), dimethyldiphenylene diisocyanate (TOID), and tolylene diisocyanate (TDI).

Examples of the tri- or more-functional isocyanate compound include biuret-modified products and isocyanurate-modified products of diisocyanates (compounds having two NCO groups in one molecule), adduct products (polyolmodified products) with tri- or more-hydric polyols (compounds having at least three OH groups in one molecule) such as trimethylolpropane (TMP) and glycerol, and the like.

The adhesive resin composition of the present embodiment has a solid content concentration of preferably 5% by mass or more, more preferably 6% by mass or more, and particularly preferably 7% by mass or more. Additionally, the solid content concentration is preferably 20% by mass or less, more preferably 18% by mass or less, and particularly preferably 16% by mass or less. The above-mentioned upper limit values and lower limit values of the solid content concentration can be arbitrarily combined. By adjusting the solid content concentration as described above, an adhesive resin composition having good wettability and good coatability can be obtained.

Laminate

The laminate of the present invention includes a substrate and an adhesive resin layer including the adhesive resin composition of the present invention laminated on at least one side of the substrate. By laminating the above-mentioned adhesive resin layer on one side or both sides of the substrate, the laminate can adhere to an adherend with use of the above-mentioned adhesive resin layer. It is not necessary that the substrate itself has adhesiveness, and a substrate that can adhere to the above-mentioned adhesive resin layer is preferable. Examples of the substrate include various substrates such as metal, glass, and plastics. In the present embodiment, the adhesive resin layer is formed by applying the adhesive resin composition onto an adherend, followed by drying.

EXAMPLES

The present invention will be described in further detail below by way of examples, but the present invention is not limited by these examples.

Acid Resistance Test

An acid resistance test will be described by way of FIG. 1.

Figure 2:
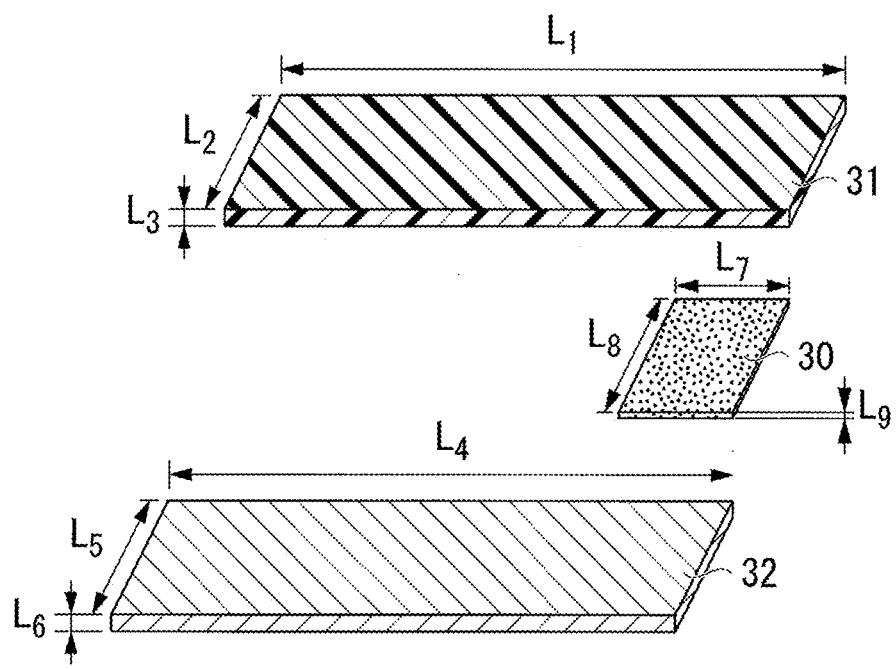
FIG. 2 is a schematic view illustrating a laminated state of a test piece used in a peeling test.

First, a laminate shown in FIG. 2 was used as a test piece. An adhesive resin composition layer 30 of each of Examples and Comparative Examples was applied in a shape of 10 mm ($L_7$)×10 mm ($L_8$)×3 μm ($L_9$) onto a polyethylene terephthalate film 32 having a thickness ($L_6$) of 100 μm, a length ($L_4$) of 50 mm, and a width ($L_5$) of 10 mm, and dried at 110° C. for 1 minute to form an adhesive film on the polyethylene terephthalate film Thereafter, a polypropylene film 31 having a thickness ($L_3$) of 50 μm, a length ($L_5$) of 50 mm, and a width ($L_2$) of 10 mm was stuck on a surface on which the adhesive film had been formed, followed by bonding with a load of 2 kg at 130° C. As an aspect of lamination, one ends thereof were aligned as shown in FIG. 2 to form the laminate.

This laminate was immersed in an acid solution (symbol 36) containing 500 ppm of hydrogen fluoride and having a pH of 2 for 1,000 hours, the polyethylene terephthalate film 32 and the polypropylene film 31 were each bent at a position of an end part of the adhesive resin composition layer 30 so that the polyethylene terephthalate film 32 was on a tensile side, and held with a holding device 33. The polyethylene terephthalate film 32 was fixed by being held with a holding device 34, and the polyethylene terephthalate film 32 was stretched in a tensile direction shown with a symbol 35 in a water bath, to measure the peeling strength.

The peeling strength was measured at a tension speed of 50 mm/min. The peeling strength (N/mm$^2$) at that time was measured, and results of evaluation according to the following evaluation criteria are described in Tables 1 and 2.
[Evaluation Criteria]

Evaluation was performed on the following four stages, and A or higher grade was determined to be acceptable.
  ⊙: 1 N/mm$^2$ or more
  ○: 0.5 N /mm$^2$ or more and than 1 N/mm$^2$
  Δ: 0.2 N/mm$^2$ or more and less than 0.5 N/mm$^2$
  ×: Less than 0.2 N/mm$^2$ Adhesiveness Test A similar laminate to the test piece used in the above-mentioned <Acid Resistance Test> was used as a test piece.

The resulting laminate was placed into a high temperature thermo machine at 80° C. and a humidity of 95% for 1,000 hours.

Thereafter, the test piece was dried under conditions of 23° C. and a humidity of 50% for 1 hour.

The polyethylene terephthalate film and the polypropylene film were each bent at a position of an end part of the adhesive layer so that the polypropylene film was on a tensile side. The polypropylene film was held with a holding device, the polyethylene terephthalate film was fixed by being held with a holding device, and the polypropylene film was stretched to measure the peeling strength.

The peeling strength was measured at a tension speed of 50 mm/min. The peeling strength (N/mm$^2$) at that time was measured, and results of evaluation according to the following evaluation criteria are described in the following tables.
[Evaluation Criteria]

Evaluation was performed on the following four stages, and A or higher grade was determined to be acceptable.
  ⊙: 0.7 N/mm$^2$ or more
  ○: 0.5 N/mm$^2$ or more and less than 0.7 N/mm$^2$
  Δ: 0.3 N/mm$^2$ or more and less than 0.5 N/mm$^2$
  ×: Less than 0.3 N/mm$^2$ Uniform Coatability Test The resulting adhesive resin composition was applied onto a PET film with an applicator and dried at 100° C. for 1 minute. Thereafter, a sample having a size of 20 cm×30 cm was produced, the presence or absence of application unevenness was confirmed visually, and was evaluated according to the following criteria. Evaluation was performed on the following four stages, and Δ or higher grade was determined to be acceptable.
  ⊙: There is no application unevenness.
  ○: There is fine application unevenness.
  Δ: A resin component and a solvent component are separated.
  ×: A resin component is precipitated.

Production of Adhesive Resin Composition

The (A) component, the (B) component, the (C) component, and the (S) component shown in the following Tables 1 and 2 were mixed to obtain adhesive resin compositions of Examples 1 to 8 and Comparative Examples 1 to 5.

Using a solution having a ratio of toluene of 80, methylcyclohexane of 10, and methyl ethyl ketone of 10 as expressed by weight ratio, the (S) component as a solvent component was prepared so that the solid content amount was 10%. Regarding Comparative Example 4, an adhesive resin composition was obtained by melting and kneading the components without using the (S) component.

In Tables 1 and 2 below, a numerical value shown in [ ] is a blending amount (parts by mass). The solid content concentration of each adhesive resin composition was set to 10% by mass.

In Comparative Example 4, an adhesive layer was formed by melting and kneading each component to produce pellets and extrusion-molding the resulting pellets, but the planarity was remarkably worse, and evaluation could not be performed.

In Comparative Example 5, when each component was mixed, the (A) component was not dissolved due to its high molecular weight, and an adhesive resin composition could not be produced.

(A)—4: Maleic acid-modified polypropylene-4, molecular weight: 190,000, acid addition: 1.1% by mass, melting point: 130° C.
(B)—1: Special novolac-type epoxy resin (epoxy equivalent: 200, softening point: 70° C.), which comprises a bisphenol A skeleton in a molecule and a novolac epoxy group.
(B)—2: Phenoxy resin, which comprises a bisphenol A skeleton in a molecule and an epoxy group at a molecular end.
(C)—1: Amine-modified hydrogenated styrene-based thermoplastic elastomer.
(C)—2: Nylon resin (having an amino group as a terminal substituent).
(C)—3: Melamine resin (having an amino group as a terminal substituent).

TABLE 1

| | (A) Component | (B) Component | (C) Component | (S) Component | Adhesiveness | Acid Resistance | Uniform Coatability |
|---|---|---|---|---|---|---|---|
| Example 1 | (A)-1 [100] | (B)-1 [20] | (0-1 [10] | Presence | ⊙ | ⊙ | ⊙ |
| Example 2 | (A)-1 [100] | (B)-1 [20] | (C)-2 [10] | Presence | ○ | ○ | ⊙ |
| Example 3 | (A)-1 [100] | (B)-1 [20] | (C)-3 [10] | Presence | ○ | ○ | ⊙ |
| Example 4 | (A)-1 [100] | (B)-1 [20] | (C)-4 [10] | Presence | ○ | ○ | ⊙ |
| Example 5 | (A)-1 [100] | (B)-1 [20] | (C)-5 [10] | Presence | ○ | ○ | ⊙ |
| Example 6 | (A)-2 [100] | (B)-1 [20] | (C)-2 [10] | Presence | Δ | Δ | Δ |
| Example 7 | (A)-3 [100] | (B)-1 [20] | (C)-2 [10] | Presence | Δ | Δ | Δ |
| Example 8 | (A)-1 [100] | (B)-2 [20] | (C)-2 [10] | Presence | ○ | Δ | ○ |

TABLE 2

| | (A) Component | (B) Component | (C) Component | (S) Component | Adhesiveness | Acid Resistance | Uniform Coatability |
|---|---|---|---|---|---|---|---|
| Comparative Example 1 | (A)-1 [100] | (B)-1 [20] | — | Presence | ○ | × | Δ |
| Comparative Example 2 | (A)-1 [100] | — | (C)-1 [10] | Presence | Δ | × | Δ |
| Comparative Example 3 | (A)-1 [100] | (B)-1 [20] | (C)-6 [10] | Presence | Δ | × | × |
| Comparative Example 4 | (A)-1 [100] | (B)-1 [20] | (C)-1 [10] | Absence | An adhesive layer was formed, but the planarity was remarkably deteriorated, and evaluation could not be performed. | | |
| Comparative Example 5 | (A)-4 [100] | (B)-1 [20] | (C)-1 [10] | Presence | A component was not dissolved, and an adhesive resin composition could not be produced. | | |

In the above-mentioned tables, each symbol means the following material.
(A)—1: Maleic acid-modified polypropylene-1, molecular weight: 90,000, acid addition: 1.1% by mass, melting point: 80° C.
(A)—2: Maleic acid-modified polypropylene-2, molecular weight: 110,000, acid addition: 0.5% by mass, melting point: 90° C.
(A)—3: Maleic acid-modified polypropylene-3, molecular weight: 30,000, acid addition: 2.0% by mass, melting point: 55° C.
(C)—4: Urea resin (having an amino group as a terminal substituent).
(C)—5: Polyamine resin (having an amino group as a terminal substituent).
(C)—6: N,N,N',N' -tetraglycidyl-m-xylenediamine (molecular weight: 360).

As shown in the above-mentioned results, when the adhesive resin compositions of Examples 1 to 8 were used, the acid resistance was good, and both the adhesiveness and the uniform coatability were also good in all cases.

In contrast, Comparative Example 1 in which the (C) component was not added had a result that the acid resistance was low. In Comparative Example 2 in which the (B) component was not added, the adhesiveness was not good and the acid resistance was also low. Additionally, Comparative Example 3 in which an amine component having no amino group at a molecular end was added had a result that the acid resistance was low.

DESCRIPTION OF THE REFERENCE NUMERALS

30: Adhesive resin composition layer
31: Polypropylene film
32: Polyethylene terephthalate film
33, 34: Holding device
36: Acid solution
37: Water bath

What is claimed is:

1. An adhesive resin composition consisting essentially of:
   an acid-modified polyolefin resin component (A) having a weight average molecular weight of 30,000 or more and 150,000 or less;
   a resin component (B) having an epoxy group in a molecule;
   a resin component (C) having an amino group at a molecular end;
   an isocyanate compound (D); and
   a solvent (S),
   wherein
   a content of said resin component (B) is 1 part by mass or more and 30 parts by mass or less based on 100 parts by mass of said acid-modified polyolefin resin component (A),
   a content of said resin component (C) is 6 parts by mass or more and 15parts by mass or less based on 100 parts by mass of said acid-modified polyolefin resin component (A),
   said acid-modified polyolefin resin component (A) is polyethylene, polypropylene, poly-1-butene, or polyisobutylene which is modified with an unsaturated carboxylic acid or a derivative thereof selected from the group consisting of maleic anhydride, itaconic anhydride, citraconic anhydride, nadic anhydride, methyl acrylate, methyl methacrylate, ethyl acrylate, butyl acrylate, maleic acid monoethyl ester, acrylamide, maleic acid monoamide, maleimide, N-butylmaleimide, sodium acrylate, and sodium methacrylate,
   said acid-modified polyolefin resin component (A) does not comprise a copolymer of propylene and an olefin-based monomer, and
   said resin component (C) is at least one selected from the group consisting of diethylenetriamine, triethylenetetramine, tetraethylenepentamine, an amine-modified hydrogenated styrene-based thermoplastic elastomer in which a molecular end is modified with an amino group, polyethyleneimine, nylon 6, nylon 66, and nylon 12,
   wherein the adhesive resin composition is used in the interior of outer packages of batteries.

2. The adhesive resin composition according to claim 1, wherein said acid-modified polyolefin resin component (A) has an acid addition amount of 0.5% by mass or more and 3.0% by mass or less.

3. The adhesive resin composition according to claim 1, wherein said acid-modified polyolefin resin component (A) has a melting point of 50° C. or higher and 85° C. or lower.

4. A laminate comprising:
   an adherend; and
   an adhesive resin layer laminated on one side of said adherend,
   wherein said adhesive resin layer is formed of the adhesive resin composition according to claim 1.

* * * * *